US011002372B2

(12) United States Patent
Kou (10) Patent No.: US 11,002,372 B2
(45) Date of Patent: May 11, 2021

(54) DIAPHRAGM VALVE (71) Applicant: Kitz SCT Corporation, Tokyo (JP)

(72) Inventor: Chokuto Kou, Gunma (JP)

(73) Assignee: KITZ SCT CORPORATION, Tokyo (JP)

(*) Notice: Subject to any disclaimer, the term of this patent is extended or adjusted under 35 U.S.C. 154(b) by 77 days.

(21) Appl. No.: 16/468,344

(22) PCT Filed: Nov. 15, 2017

(86) PCT No.: PCT/JP2017/041035
§ 371 (c)(1),
(2) Date: Jun. 11, 2019

(87) PCT Pub. No.: WO2018/142717
PCT Pub. Date: Aug. 9, 2018

(65) Prior Publication Data
US 2020/0173564 A1    Jun. 4, 2020

(30) Foreign Application Priority Data

Jan. 31, 2017  (JP) .............................. JP2017-15725

(51) Int. Cl.
F16K 7/16        (2006.01)
F16K 31/52       (2006.01)
F16K 31/524      (2006.01)

(52) U.S. Cl.
CPC .......... F16K 7/16 (2013.01); F16K 31/52491 (2013.01)

(58) Field of Classification Search
CPC .. F16K 7/16; F16K 31/52491; F16K 27/0236; F16K 7/00; F16K 7/126; F16K 7/17; F16K 7/123
See application file for complete search history.

(56) References Cited

U.S. PATENT DOCUMENTS 3,053,499 A  *  9/1962  Jones ........................ F16K 7/16
                                                         251/284
3,743,245 A  *  7/1973  Dernier, Sr. .............. F16K 7/16
                                                         251/257
(Continued)

FOREIGN PATENT DOCUMENTS

EP       1 610 044        12/2005
JP       08-105554         4/1996
(Continued)

OTHER PUBLICATIONS

International Search Report dated Feb. 20, 2018 in International (PCT) Application No. PCT/JP2017/041035.

Primary Examiner — Kelsey E Cary
(74) Attorney, Agent, or Firm — Wenderoth, Lind & Ponack, L.L.P.

(57) ABSTRACT

A diaphragm valve includes a valve seat disposed in a valve chamber in a body, an annular groove provided on the outer periphery of the valve seat, a diaphragm provided so as to be able to make contact with and leave the valve seat via a pressurizing device, and a primary-side flow path communicating the valve chamber, in which an inner diameter of a secondary-side flow path contiguously provided to the annular groove is 2.0 to 4.5 times a groove width of the annular groove, and an intersection cross-sectional area between the annular groove and the secondary-side flow path is smaller than a cross-sectional area of the secondary-side flow path and the intersection cross-sectional area is configured to be equal to or larger than 35% with respect to a sectional area of the secondary-side flow path to acquire a predetermined Cv value.

5 Claims, 5 Drawing Sheets (56) References Cited

U.S. PATENT DOCUMENTS

| | | | | |
|---|---|---|---|---|
| 2008/0224081 A1* | 9/2008 | Miyazaki | ............... | F16K 1/30 |
| | | | | 251/331 |
| 2011/0140014 A1* | 6/2011 | Schmit | ............... | F16K 7/16 |
| | | | | 251/61 |
| 2013/0119290 A1* | 5/2013 | Takeda | ............... | F16K 7/17 |
| | | | | 251/333 |
| 2014/0251463 A1* | 9/2014 | Schneidewend | .... | F16K 31/3855 |
| | | | | 137/535 |
| 2014/0326915 A1* | 11/2014 | Kitano | ............... | F16K 7/12 |
| | | | | 251/331 |
| 2016/0178072 A1* | 6/2016 | Kitano | ............... | F16K 7/14 |
| | | | | 251/331 |
| 2018/0031141 A1* | 2/2018 | Ye | ............... | F16K 31/145 |
| 2018/0119586 A1* | 5/2018 | Bock | ............... | F16K 17/0453 |
| 2018/0283572 A1* | 10/2018 | Bartow | ............... | B29C 66/5412 |

FOREIGN PATENT DOCUMENTS

| | | |
|---|---|---|
| JP | 4587419 | 11/2010 |
| WO | 2005/066528 | 7/2005 |

\* cited by examiner

DIAPHRAGM VALVE

TECHNICAL FIELD

The present invention relates to diaphragm valves and, in particular, to a diaphragm valve capable of exhibiting a stable high flow (high Cv value) while being downsized to an extremely compact form, and extremely suitable for use in, for example, a gas supply system of a semiconductor manufacturing apparatus.

BACKGROUND ART

In general, as a control valve for a gas supply system in semiconductor manufacturing process or the like, a so-called direct-touch-type diaphragm valve is mainly used. The direct diaphragm valve has its advantages in which the seat is directly closed also with a metal diaphragm for use as a material for sealing outside, a very simple flow path without having extra components in a gas contact part can be configured, and this is thus thought to be an optimum structure for cleaning a fluid, without a part where metals slide each other inside the gas contact part. However, there is a limit to the stroke that can be ensured, and it is structurally difficult to ensure a large flow rate, compared with other valve types such as a bellows valve.

Also, to manufacture highly accurate devices such as semiconductor elements with high quality, semiconductor manufacturing process facilities such as a gas supply system as described above are required to be entirely accommodated in a so-called clean room. The clean room is a hermetic space where airborne particles and microbes are controlled at a predetermined level of cleanliness (contamination control); workers to enter the room, as well as materials, chemicals, water, and so forth to be brought in, are ensured to have a predetermined level of cleanliness; and environmental conditions such as temperature, moisture, and pressure are also controllable as required. In introducing the clean room, initial cost of equipment, which increases with capacity, and running cost for maintenance and continuous operation are required, which are a large burden as cost of production equipment. Thus, in introducing the clean room, the clean room has to be designed so as to have capacity and structure that are optimum in accordance with the use purpose and prevent the occurrence of waste.

Thus, it is a basic requirement that the diaphragm valve as described above be downsized to a compact form as much as possible. For example, in an integrated gas system, a valve body is incorporated and integrated in a compact base block without joints together with other devices and the like. In particular, in recent years, specifically, it has become general to also use, for example, a valve body significantly downsized to a compact form to the extent that the flow diameter is on the order of several millimeters and the valve body can fit in a rectangular parallelepiped shape with one side being on the order of 3 cm.

On the other hand, in recent years, demands for higher performance, more power saving, an improvement in performance, and so forth of semiconductor-mounted devices such as smartphones are increasing more. Accordingly, microfabrication and high integration are more required for semiconductor elements, and diversification of semiconductor manufacturing process has been significantly advancing. Thus, also for various process gases for use in manufacturing process, higher temperature, higher pressure, and so forth are involved in accordance with individual use purposes. In particular, in accordance with an increase in the diameter of a silicon wafer, an increase in the size of a liquid-crystal panel or the like, an increase in the size of a production system, a change to a special gas supply scheme, and so forth, a further increase in a supply flow rate (high flow) has become a basic demand. Thus, also for the diaphragm valve as described above for use as a supply gas control valve, valve development optimum for individual use purposes is thought to be required. In contrast to the demands for compactization, in particular, demands for a larger flow rate (increase in a Cv value) are increasing more.

The Cv value of the valve is basically defined in accordance with the size of a flow-path sectional area or the magnitude of fluid resistance, apart from fluid property and so forth. Therefore, for making a high flow, it is only required to increase flow-path capacity while appropriately designing a flow-path structure without increasing the fluid resistance or so as to decrease the fluid resistance in the valve. Thus, basically, if a flow path is appropriately formed by increasing the size of the valve structure (or applying a large-sized, large-capacity valve) to enhance flexibility of flow-path design, a high flow in accordance with a necessary Cv value can be achieved relatively easily.

However, as described above, the diaphragm valve is integrated so as to eliminate a dead space as much as possible together with other devices and the like, and also diaphragm valves are normally provided at a plurality of locations. Therefore, if the size is increased, its occupying space is also increased, thereby not only impairing the basic demands for compactization but also impairing optimization of the occupying space of the entire gas supply system and, in turn, it is unavoidable to also increase the capacity of the clean room which accommodates this. This brings an increase in cost of semiconductor manufacturing equipment, and poses a problem of worsening manufacturing cost of semiconductor products. In particular, in recent years, with diversification and sophistication of manufacturing process, tendencies to require switching and control of gases of many types are high, and therefore the number of valves to be installed tends to be increasing. Thus, the need to decrease the footprint of individual valves to reduce an increase in the installation area is increasing more. Therefore, the valve for use in a semiconductor manufacturing apparatus has to keep its size or be further downsized and then stabilize the flow rate and increase the flow rate.

Thus, means is thought in which the size of the valve body (in particular, valve body of a compact size on the order of several centimeters) is kept or further downsizing is sought after and, in the capacity inside the body of this limited size, a large-capacity flow-path space capable of achieving a high Cv value is appropriately formed to exhibit a stable high flow. According to this optimization of the flow-path structure and shape, a high flow can be achieved in the simplest way without further using another member for the valve or excessively making the structure of the valve complex, with the number of components being kept and also regardless of the fluid for use. This is optimum also from aspects of productivity and cost of the valve and so forth. Conventionally, in view of the above circumstances, various diaphragm valves have been suggested, examples of which are PTLs 1 and 2.

Depicted in PTL 1 is a groove part formed on the periphery of a valve seat on the inner surface of a valve chamber. This groove part includes a groove mouth that is open with an area wider than a circle with the groove width taken as a diameter. Also, at least a part of this groove mouth is open to a groove side surface. Furthermore, the groove part has a predetermined groove depth and a groove bottom surface, and this groove bottom surface has a shape deeper toward the groove mouth.

A metal diaphragm valve disclosed in PTL 2 includes a metal diaphragm having a center part swelled upward. The case is such that an intersection cross-sectional area between an annular groove formed in a lower part of a valve chamber and communicating an outflow path and the outflow path is larger than the cross-sectional area of the outflow path. Also, the case is such that the annular groove includes both side surfaces and a bottom surface, the outflow path is connected to both side surfaces and the bottom surface of the annular groove, and the diameter of the outflow path is made larger than the groove width of the annular groove or the structure is such that the diameter of the outflow path assuming a circular cross section is made 1.5 to 2.5 times larger than the groove width of the annular groove. This structure allows flowing at a large flow rate as a whole flow path from the valve chamber to the outflow path.

CITATION LIST

Patent Literatures

PTL 1: WO2005/066528
PTL 2: Japanese Patent No. 4587419

SUMMARY OF INVENTION

Technical Problem

However, while PTL 1 allows an increase in the flow rate, the technology is suggested basically as a gas container valve, and the valve assumed therein is different in use situation from the present invention and a main subject is placed on gas replaceability such as vacuum exhaust ability and purge ability. Thus, this is totally inappropriate for a valve which seeks achievement of a stable high Cv value while keeping the size of the valve for use in the gas supply system as compact as possible. Moreover, PTL 1 merely discloses an extremely simple shape as for a specific flow-path structure.

In particular, in the flow-path structure of PTL 1, the structure of a second flow path serving as an exit side, which is important to exhibit a stable high Cv value, is merely disclosed on its drawings. Specifically, while the inner diameter of the second flow path is formed to the extent of being slightly larger than the groove width of the groove part, the size of the inner diameter of the flow path on the exit side is not sufficient at all in order to achieve a high Cv value while ensuring a flow-path space at maximum in the limited body size. Therefore, PTL 1 does not consider at all a view of optimally utilizing the capacity inside the body at maximum in the valve downsized to a compact form as used particularly in a gas supply system.

In PTL 2, the intersection cross-sectional area between the annular groove and the outflow path is defined. This intersection cross-sectional area is formed larger than the cross-sectional area of the outflow path. However, when this large intersection cross-sectional area is tried to be ensured, a secondary-side flow path has to be formed in the body so as to considerably deeply cross toward the annular groove. In this case, with the secondary-side flow path formed closely to other portions such as a fixing part for fixing the outer periphery of the diaphragm and a valve seat, there is a fear of impairing the strength of the valve body. There is also a problem in which the position and direction of the secondary-side flow path that can be formed in the body may be limited, depending on the body shape and the use situation of the valve, Also in the flow-path structure of PTL 2 the diameter of the outflow path having a circular cross section is formed so as to have a size of 1.5 to 2.5 times the groove width of the annular groove. However, it is unavoidable to say that even the size of the diameter on this degree is not sufficient yet in view of ensuring the occupying space of the flow-path space in the limited capacity inside the body at maximum and, in particular, in view of having to satisfy high requirement standards for both of compactness and a stable high flow in recent years.

Still further, in both of PTLs 1 and 2, a tip part of the secondary-side flow path (the deepest part of the valve) reaches the position of the inner diameter of the annular groove or is formed to a position entering further deeper from this inner diameter. Normally, when the secondary-side flow path is formed in the body, cutting is performed with a predetermined blade. When the secondary-side flow path is formed in the body to the depth larger than the inner diameter of the annular groove in this manner, the tip of the cutting blade may reach a position immediately below the valve seat or a nearby position such as one near an outer swaged part, depending on the manner of control of cutting dimensions. If cutting reaches a position too near the valve seat, the strength of the outer swaged part is unbalanced and the swaged state is nonuniform in the process of swaging the valve seat. This may adversely affect sealability of the valve. Thus, the flow-path space has to be optimally ensured by preventing the depth of the secondary-side flow path from reaching a position near the valve seat.

Thus, the present invention has been developed to solve the above-described problems, and has an object of providing a diaphragm valve capable of exhibiting a high flow and a stable high Cv value by allowing an optimum flow space to be formed in accordance with a predetermined Cv value without impairing body strength even if the valve is downsized to an extremely compact form.

Solution to Problem

To achieve the object described above, a first aspect of the invention is directed to a diaphragm valve including a valve seat disposed in a valve chamber in a body, an annular groove provided on the outer periphery of the valve seat, a diaphragm provided so as to be able to make contact with and leave the valve seat via pressurizing means, and a primary-side flow path communicating the valve chamber, wherein an inner diameter of a secondary-side flow path contiguously provided to the annular groove is 2.0 to 4.5 times a groove width of the annular groove, and an intersection cross-sectional area between the annular groove and the secondary-side flow path is smaller than a cross-sectional area of the secondary-side flow path and the intersection cross-sectional area is configured to be equal to or larger than 35% with respect to a sectional area of the secondary-side flow path to acquire a predetermined Cv value.

A second aspect of the invention is directed to the diaphragm valve, in which the inner diameter of the secondary-side flow path is 2.8 to 4.5 times the groove width of the annular groove.

A third aspect of the invention is directed to the diaphragm valve, in which the inner diameter of the secondary-side flow path is made linearly cross the annular groove, and a semi-circular portion of the secondary-side flow path is contiguously provided to the outer diameter of the annular groove.

A fourth aspect of the invention is directed to the diaphragm valve, in which a semicircular notched groove is formed by contiguously providing the secondary-side flow path to a position being short of and not reaching the inner diameter of the annular groove, and an abutting surface of this semicircular notched groove has a flat shape made by flat end processing.

A fifth aspect of the invention is directed to the diaphragm valve, in which the intersection cross-sectional area is an area acquired by adding an area of the semi-circular portion and a contiguous area of the semicircular notched groove together.

A sixth aspect of the invention is directed to the diaphragm valve, in which the predetermined Cv value is equal to or larger than 0.75.

Advantageous Effects of Invention

According to the first aspect of the invention, the inner diameter of the secondary-side flow path contiguously provided to the annular groove is 2.0 to 4.5 times a groove width of the annular groove. Therefore, a sufficiently large inner diameter and capacity of the secondary-side flow path can be ensured, and thus an occupying space of the flow path is ensured with sufficient efficiency is ensured in the capacity inside the valve body downsized to a compact form.

Also, the intersection cross-sectional area between the annular groove and the secondary-side flow path is an area smaller than the cross-sectional area of the secondary-side flow path and equal to or larger than 35%. Therefore, when the fluid flows out from the annular groove to the secondary-side flow path, the flow-path cross-sectional area is mildly enlarged without being narrowed or abruptly changed. Furthermore, the secondary-side flow path is formed in an extremely large flow space. Thus, even in the capacity inside the valve body downsized to a compact form, an extremely large flow rate of the fluid from a valve chamber side to a secondary side can be ensured, and a high flow can be reliably achieved. Also, the flow of the fluid is stabilized, and the range of fluctuation of the Cv value is reduced and not varied.

Furthermore, since it is not required to form a large intersection cross-sectional area in processing of the secondary-side flow path, excessively deep cutting toward the annular groove is not required, and the body strength is not impaired. Also, processing easy. Thus, the invention can be applied to valve bodies of various types. Thus, an optimum flow path space in accordance with a predetermined Cv value required for wide-ranging valve bodies can be designed, and processing workability is extremely favorable.

According to the second aspect of the invention, the inner diameter of the secondary-side flow path is 2.8 to 4.5 times the groove width of the annular groove. Thus, the size of the inner diameter is made suitable and, in particular, a high Cv value required in gas supply systems of semiconductor manufacturing apparatus and so forth in recent years can be stably acquired.

According to the third aspect of the invention, the inner diameter of the secondary-side flow path is made linearly cross the annular groove. Thus, processing the secondary-side flow path to the inside of the body is made extremely easy. Also, passage and outflow of the fluid from the annular groove becomes favorable. In addition, the semi-circular portion of the secondary-side flow path is contiguously provided to the outer diameter of the annular groove. Thus, the fluid in the valve chamber can flow directly from the semi-circular portion that is widely open to the side surface of the annular groove to the secondary-side flow path and, with the linear shape of the secondary-side flow path, outflow efficiency is extremely improved, thereby allowing a high flow and a stable high Cv value of the valve to be exhibited. Furthermore, the semi-circular portion can be formed by putting a rotating cutting blade for the secondary-side flow path as it is into the annular groove, and processing is therefore very easy.

According to the fourth aspect of the invention, the semicircular notched groove is formed by contiguously providing the secondary-side flow path to a position being short of and not reaching the inner diameter of the annular groove. Thus, the tip part of the secondary-side flow path is not processed to the inner diameter of the annular groove, at least a deep position near the outer diameter position of the valve seat. Thus, there is no fear of causing the strength of an outer swaged part of the valve seat to be unbalanced to adversely affect swaging process. Also, the abutting surface that is a semicircular portion has a flat shape made by flat end processing. Thus, the maximum intersection cross-sectional area can be ensured.

According to the fifth aspect of the invention, the intersection cross-sectional area is an area acquired by adding the area of the semi-circular portion and the contiguous area of the semicircular notched groove together. Thus, the intersection cross-sectional area can be designed with extreme ease, and a high flow rate and a stable Cv value can be reliably acquired.

According to the sixth aspect of the invention, since the predetermined Cv value is equal to or larger than 0.75. Thus, a high-flow valve capable of stably supporting many use conditions can be provided, and objects such as compactization, flow rate stability, and a high flow can be solved all at once.

BRIEF DESCRIPTION OF DRAWINGS

FIG. 5(*a*) is a side view of the valve body of the present example schematically depicted, and FIG. 5(*b*) is a plan view of the valve body of the present example schematically depicted.

DESCRIPTION OF EMBODIMENTS

Figure 1:
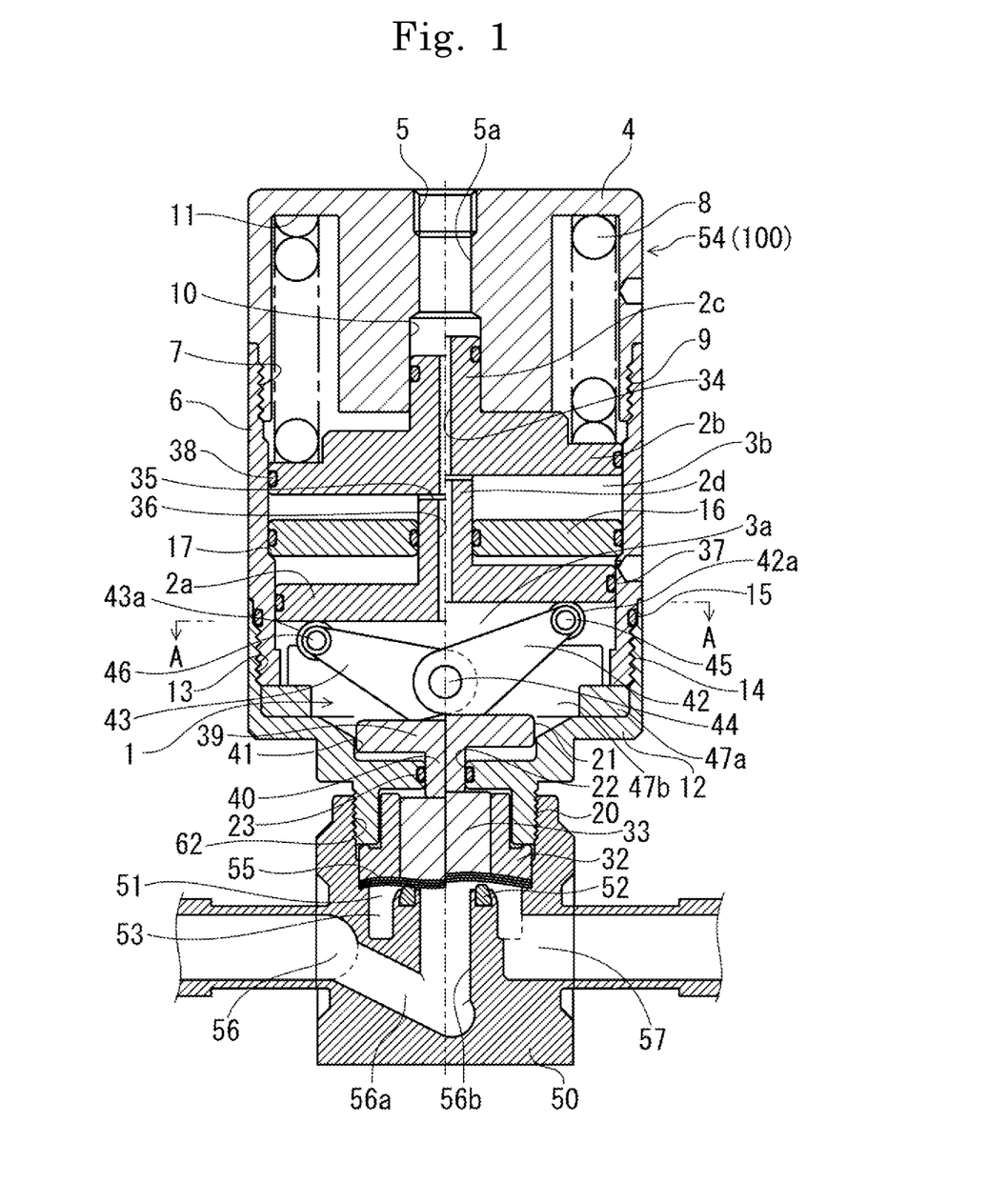
FIG. 1 is a sectional view of a diaphragm valve of the present example.
Figure 2:
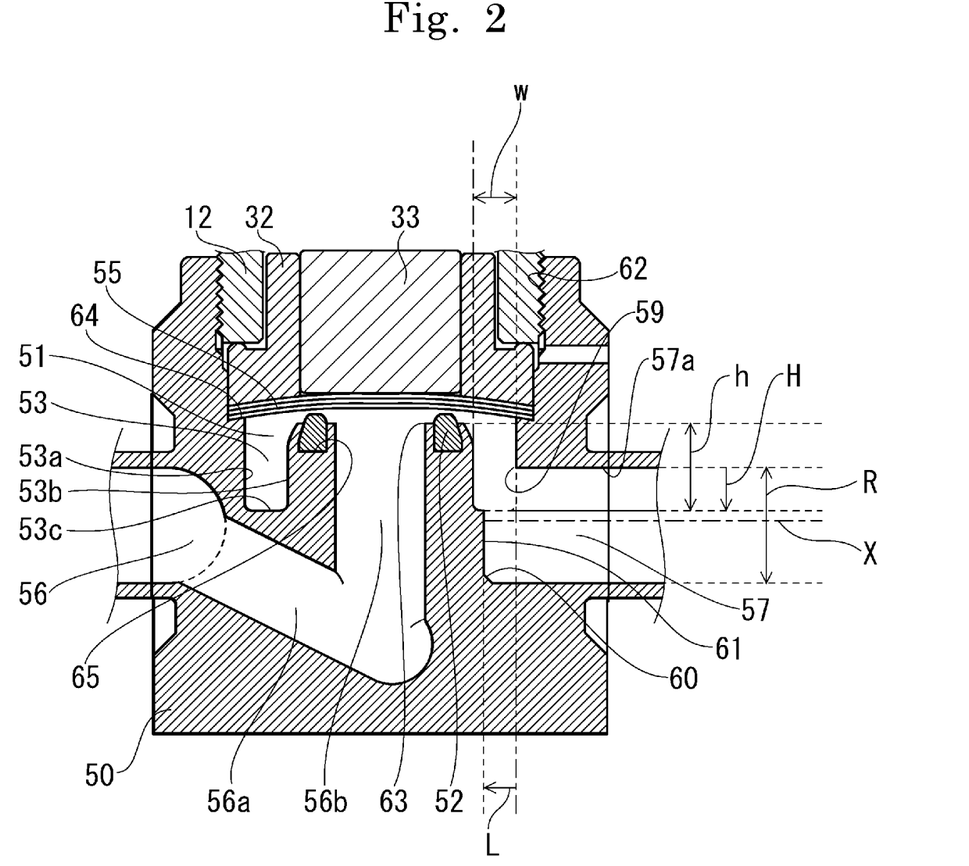
FIG. 2 is an enlarged sectional view of main parts in which a valve body in a valve full-open state of FIG. 1 is depicted as being partially enlarged.

In the following, a structure of the present invention according to one embodiment is described in detail based on the drawings. FIG. 1 is a sectional view of a valve actuator of the present embodiment (present example) and a diaphragm valve of the present example in a state of including this, in which a left half from a center line in the drawing depicts a valve full-closed state of the present example and a right half depicts a valve full-open state of the present example. FIG. 2 is an enlarged sectional view of main parts in which a portion of a body 50 of the valve in FIG. 1 is depicted as being enlarged. Note that the structure and mechanism of the valve actuator of the present example will be described further below by using FIG. 1.

In FIGS. 1 and 2, the diaphragm valve of the present example includes a valve seat 52 disposed in a valve chamber 51 in the body 50, an annular groove 53 provided on the outer periphery of the valve seat 52, a diaphragm 55 provided so as to be able to make contact with and leave the valve seat 52 via pressurizing means 54, and a primary-side flow path 56 communicating the valve chamber 51. Note that the pressurizing means 54 of the present example includes a pneumatic actuator main body 100 in the body 50, thereby configuring an air-drivable diaphragm valve. Except this, a manual mechanism with a handle or the like may be used as the pressurizing means 54, and any means capable of pressurizing the diaphragm 55 can be selected in accordance with implementation.

The body 50 is made of metal (SUS316L) having a substantially rectangular parallelepiped shape with one side being approximately on the order of 3.5 centimeters. On both side surfaces, a primary-side flow path 56 and a secondary-side flow path 57 are respectively provided to a substantially horizontal direction. The primary-side flow path of the present example has an inner diameter substantially equal to the inner diameter of the secondary-side flow path 57, is processed by cutting a side surface of the body 50 from the substantially horizontal direction toward a direction of an axial center position of the inner annular groove 53 so as to have a tip forming a spherical shape, and is formed of a tilted part 56a heading linearly downward from this spherical abutting surface and a longitudinal hole part 56b which returns vertically upward at an acute angle to open to the inside of the valve chamber 51.

The valve seat 52 is made of PCTFE in the present example, is fixedly attached as swaged and fixed to an annular attachment groove 65 provided on the outer periphery of an opening of the longitudinal hole part 56b having a substantially circular bore, and has an upper surface side where a lower surface side of the diaphragm 55 can be flexibly deformed to be closely attached (seated). The diaphragm 55 of the present example is formed in a substantially circular shape, and is configured of nine Co-alloy-made diaphragms stacked together. The outer periphery of the diaphragm 55 is interposed and fixed between a convex part 64 formed on the outer periphery of an outer side surface 53a of the annular groove 53 and a lower surface of a bonnet 32, which will be described further below.

The annular groove 53 is annularly formed on the outer periphery of the valve seat 52 and, in the present example, forms a shape having a cross section in a substantially rectangular channel shape having the outer side surface 53a, an inner side surface 53b, and a bottom surface 53c. In FIG. 2, w indicates a groove width (a half of a difference between the diameter of the outer side surface 53a and the diameter of the inner side surface 53b), and h is a groove depth of the annular groove 53 (a height difference (distance) between the opening 63 and the bottom surface 53c).

To achieve a high flow, a groove width w of the annular groove 53 is ensured at maximum as long as the structure of the body 50 permits, thereby maximizing the capacity of the valve chamber 51. That is, a maximum diameter of the outer side surface 53a is ensured to the extent of the inner diameter of the annular convex part 64, and a minimum diameter of the inner side surface 53b is ensured to the extent of the outer side of a swaged part of the annular valve seat 52 having a predetermined diameter, thereby ensuring a maximum groove width w serving as a gap between the outer side surface 53a and the inner side surface 53b.

In FIG. 2, the inner diameter of the secondary-side flow path 57 linearly crosses the annular groove 53. In the present example, at least an upper-side inner circumferential surface 57a of the secondary-side flow path 57 has a straight shape, and is formed toward the direction of the axial center position of the annular groove 53. Also, this inner circumferential surface 57a crosses the outer side surface 53a of the annular groove 53 in a direction substantially at right angles. With this linear crossing, passage of a fluid from an annular groove 53 side to a secondary-side flow path 57 side is improved, contributing to an improvement of the Cv value. Also, processability of the valve is favorable.

Figure 3:
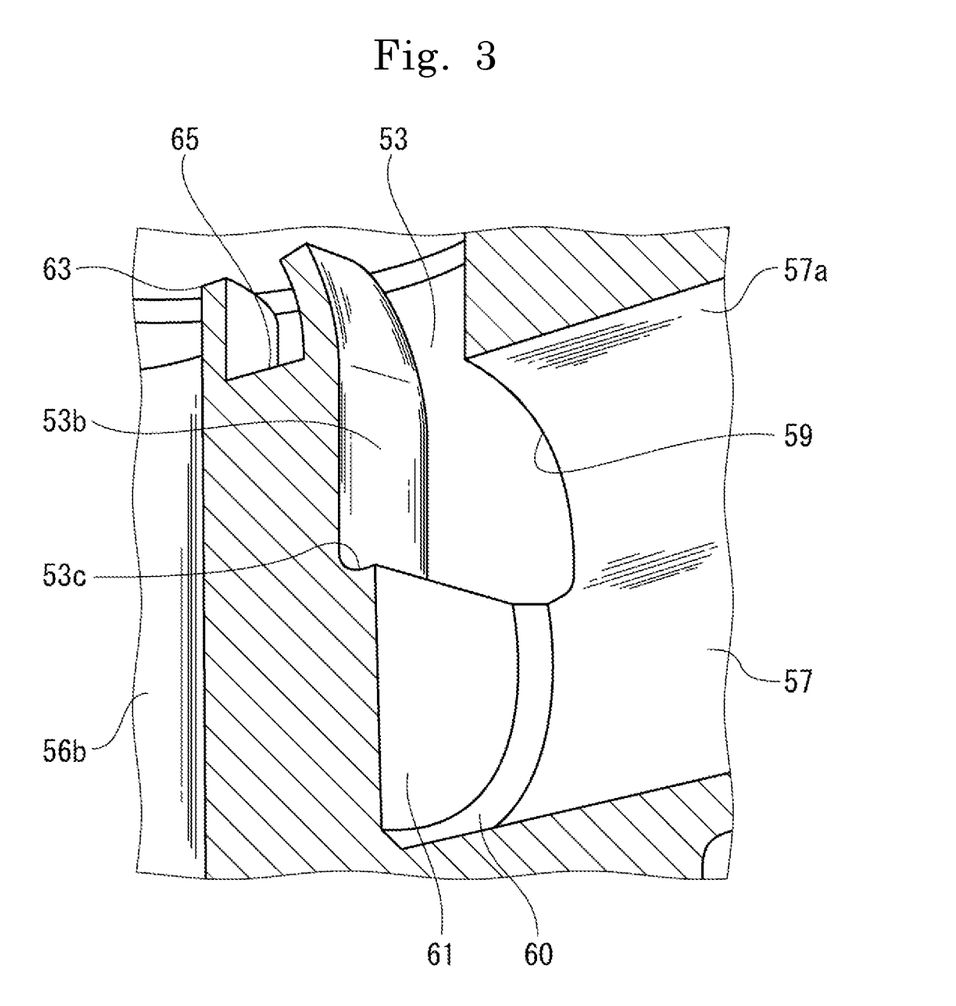
FIG. 3 is an enlarged view of main parts in which the main parts are enlarged, with a stereoscopic sectional view of the valve body of the present example schematically depicted being diagonally viewed from below.

Also, as depicted in FIG. 3, to the outer diameter of the annular groove 53, a semi-circular portion 59 of the secondary-side flow path 57 is contiguously provided. In the present example, a semicircular opening portion in a substantially cylindrical surface formed when the upper inner circumferential surface 57a of the secondary-side flow path 57 having a substantially circular cross section crosses the outer side surface 53a (outer diameter) of the annular groove 53 formed in a substantially cylindrical shape is the semi-circular portion 59. As depicted as a hatched area in FIG. 5(a), the area of this semi-circular portion 59 is taken as $S_1$. Normally, contiguously providing this semi-circular portion 59 is suitable because this can ensure a flow-path space having a large opening area and less fluid resistance in the valve chamber 51 only by boring to provide the secondary-side flow path 57 toward the annular groove 53.

Figure 4:
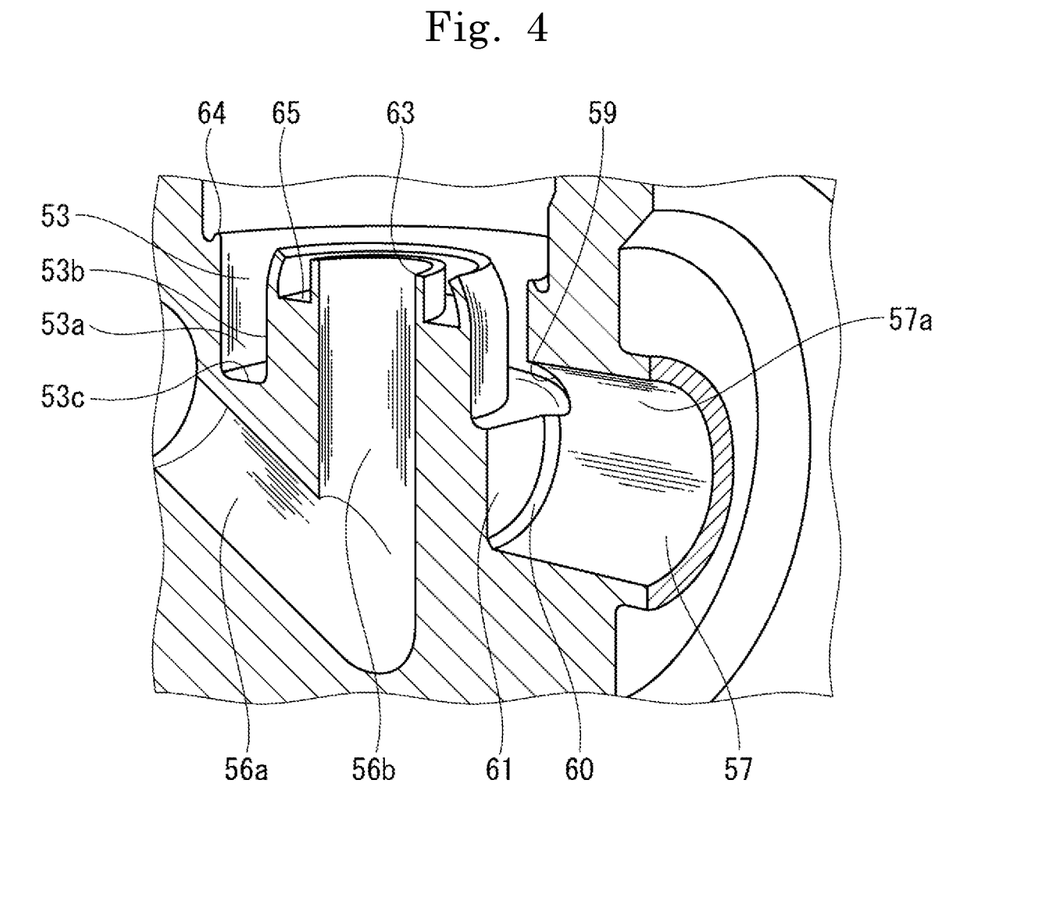
FIG. 4 is an enlarged view of main parts in which the main parts are enlarged, with a stereoscopic sectional view of the valve body of the present example schematically depicted being diagonally viewed from above.

In FIGS. 2 and 4, a semicircular notched groove 60 is formed by contiguously providing the secondary-side flow path 57 to a position being short of and not reaching the inner diameter of the annular groove 53. In the present example, the deepest position (tip part) of the secondary-side flow path 57 inside the body 50 is the position of an abutting surface 61 of the semicircular notched groove 60. This abutting surface 61 does not reach the position of the inner side surface 53b of the annular groove 53 but reach a position short thereof and, specifically, in FIG. 2, is contiguously provided to a position of a penetration depth L from the position of the outer side surface 53a to the direction of an axial center diameter of the annular groove 53. In this manner, since the abutting surface does not reach the inner diameter of the annular groove 53, there is no fear of impairment of the stiffness and strength of a support structure such as the valve seat 52 by excessive cutting.

Also, the abutting surface 61 has a flat shape made by flat end processing. The secondary-side flow path 57 is straightly engraved by a rotating blade from the side surface of the body 50 toward a substantially horizontal direction, and any shape of the abutting surface when this engraving is performed can be selected in accordance with implementation, such as a spherical shape as the primary-side flow path 56 or cone shape. In the present example, the abutting surface has a flat shape made by flat end processing. In the case of this flat shape, a contiguous area $S_2$, which will be described further below, can be formed at maximum, and an intersection cross-sectional area S can also be ensured at maximum.

In FIG. 5(b), the contiguous area $S_2$ of the semicircular notched groove 60 of the present example is depicted as a hatched region. As depicted, this area $S_2$ is an area of a region where the secondary-side flow path 57 crosses the annular groove 53 in a planar view when the body 50 is viewed down from a direction directly above. The area $S_2$ of the present example is a region in a substantially bowed shape roughly surrounded by the abutting surface 61 and the outer side surface 53a.

The intersection cross-sectional area of the present invention is an area of a boundary surface where a space region formed by the annular groove and a space region formed by the secondary-side flow path cross and is a cross-sectional area of a flow path from the valve chamber to the secondary side, and therefore the size and shape of the cross-sectional area influences the Cv value of the fluid. Basically, if the intersection cross-sectional area is large, a large Cv value can be stably acquired. However, since there is a limitation due to structural restrictions of the valve body and so forth, the intersection cross-sectional area is required to be optimally set and, here, a relation with the cross-sectional area of the secondary-side flow path is important.

Figure 5:
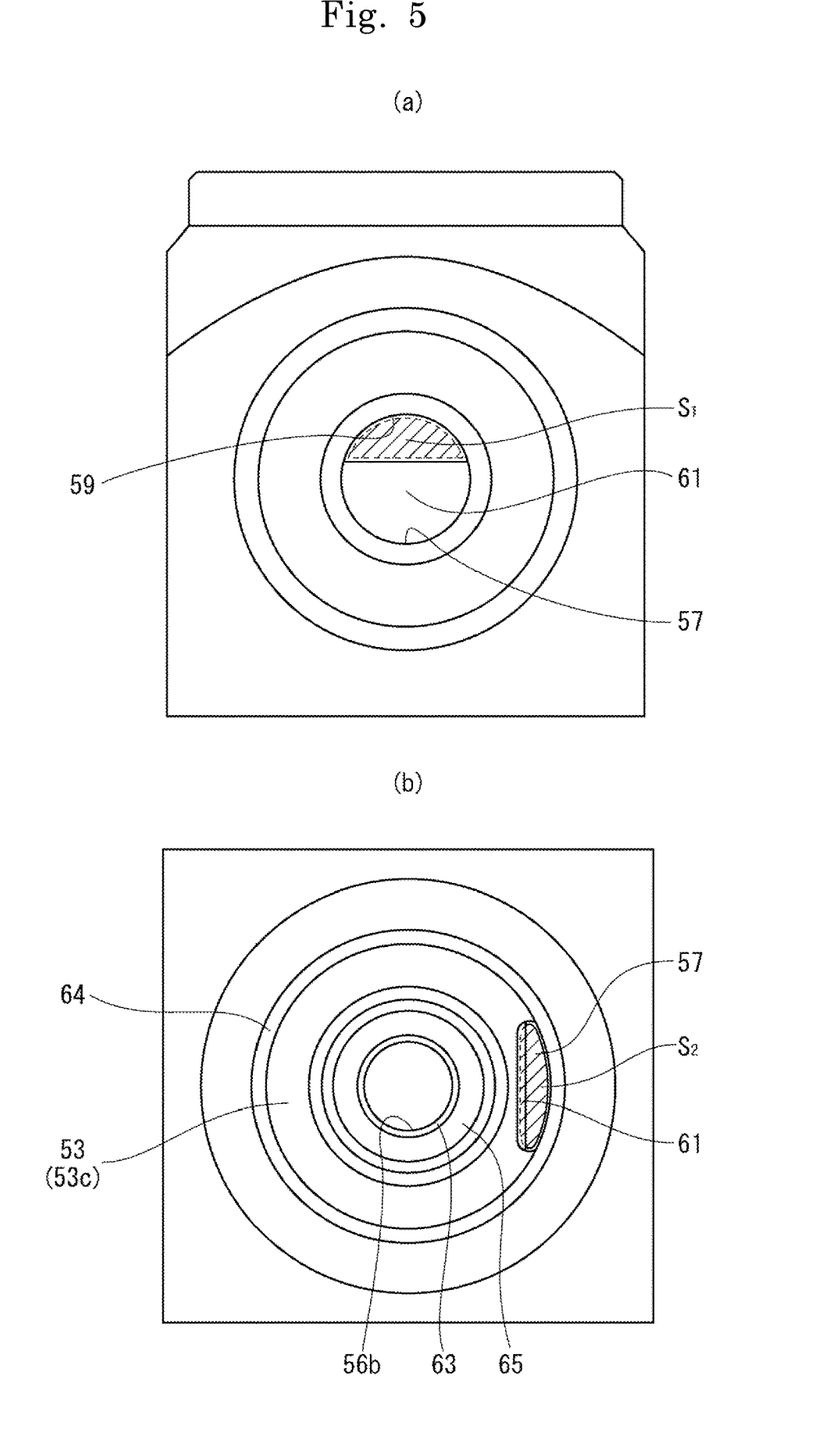

The intersection cross-sectional area S is an area acquired by adding the area $S_1$ of the semi-circular portion 59 depicted in FIG. 5(*a*) and the contiguous area $S_2$ of the semicircular notched groove 60 depicted in FIG. 5(*b*) together ($S_1+S_2$). Strictly, the definition of the intersection cross-sectional area varies and, if the region is complex, calculation of the area is complex. However, if the area is defined as in the present example, calculation of the intersection cross-sectional area S is simple while its meaning is kept, and this contributes to a simple and optimal design of the valve body.

In FIG. 2, the inner diameter R of the secondary-side flow path 57 contiguously provided to the annular groove 53 is set at 2.0 to 4.5 times, preferably 2.8 to 4.5 times, the groove width w of the annular groove 53. In the drawing, with the position of a center axis X of the secondary-side flow path 57 being fixed, the magnitude of the inner diameter R of the secondary-side flow path 57 is set from this center axis X in a radius direction. Also, in the present example, a cross-sectional area T of the secondary-side flow path 57 is substantially equal to the area of a circle calculated from the inner diameter R, because the cross section has a substantially circular shape. Furthermore, in the drawing, a height H is depicted, which will be described further below. The height H of the present example is a height difference (distance) between the position of the highest point of the upper-side inner circumferential surface 57a of the secondary-side flow path 57 and the position of the bottom surface 53c of the annular groove 53. This height H is adjusted and set by changing the position of the bottom surface 53c with the position of the upper-side inner circumferential surface 57a being fixed.

Also, the intersection cross-sectional area S between the annular groove 53 and the secondary-side flow path 57 is configured so as to be smaller than the cross-sectional area T of the secondary-side flow path 57 and be 35% or more with respect to the cross-sectional area T of the secondary-side flow path 57, thereby acquiring a predetermined Cv value. By adjusting the intersection cross-sectional area S in this manner with respect to the cross-sectional area T of the secondary-side flow path 57, the cross-sectional area of the flow path is gradually enlarged from the annular groove 53 side via the intersection region (intersection cross-sectional area S) to the secondary-side flow path 57 having the cross-sectional area T without being excessively narrowed, thereby making flow and passage favorable and allowing a highly stable Cv value to be acquired.

In the valve of the present invention, to appropriately make the valve achieve a high flow, a predetermined Cv value is set in advance, and an allowable range of the flow path structure of the body 50 that can satisfy this is set by making analysis based on predetermined fluid analyzing means. Specifically, on the precondition that the groove width w of the annular groove 53 is ensured at maximum in advance in the range of structural limitations of the body 50, the upper limit of the inner diameter R of the secondary-side flow path 57 is increased to the extent that an outer seal part remains, that is, the strength, sealability, and so forth of the body 50 are not impaired. More specifically, if the magnitude with respect to the groove width w is on the order of 4.5 times, this is enough as a condition to be satisfied by many valves, which is required for use of semiconductor manufacturing process environments in recent years.

On the other hand, the lower limit of the inner diameter R of the secondary-side flow path 57 is set at a diameter equal to or larger than a diameter that can satisfy a target Cv value appropriately set on the precondition that the inner diameter R fluctuates with fluctuations of the Cv value of the valve in the same order in magnitude. Specifically, if the inner diameter is set equal to or larger than 2.0 times, more preferably, 2.8 times, with respect to the groove width w, this is satisfactory as a characteristic of a valve for use in many use environment, such as performance (high flow and compact) required for a diaphragm valve for use in a high-purity gas supply system in semiconductor manufacturing process in recent years. The same goes for the lower limit of the intersection cross-sectional area S with respect to the cross-sectional area T of the secondary-side flow path 57. Specifically, The intersection cross-sectional area is satisfactory if it is set equal to or larger than 35% with respect to the cross-sectional area T.

Also in the present invention, the predetermined Cv value is set equal to or larger than 0.75. This is because the Cv value equal to or larger than 0.75 is a standard numerical value satisfying conditions for a high flow required in recent years, these conditions being required commonly in various valve types and use environments, and is suitable as a target numerical value to be achieved particularly in a valve downsized to a compact form for use in semiconductor manufacturing apparatuses.

Embodiment

Next, fluid analysis of the diaphragm valve of the present example is described. In this fluid analysis, 0.75 is set as a target Cv value, and a suitable numerical value range of dimensions of each component of a flow path structure formed in the body 50 satisfying this condition is found based on analysis using predetermined 3D-CAD fluid analysis software.

First, the dimensions of the annular groove 53 are studied. As a matter of course, the Cv value of the valve can be improved with a larger cross-sectional area. Thus, to achieve a high flow while avoiding an increase in the size of the valve, the cross-sectional area of the annular groove 53 is increased. However, there is a restriction in the structure of the body 50. For example, while making the diameter of the outer side surface 53a larger than the diameter of the convex part 64 interposing and fixing the outer periphery of the diaphragm 55 is not impossible but has to be avoided because of processing difficulty, and it is thus required to adopt a value on the order of the diameter of the convex part 64 at maximum. Also, since the diaphragm 55 of approximately 25 mm is used in the present example, the diameter of the outer side surface 53a is set at 422.2 mm, which is slightly smaller than the diameter of this diaphragm 55.

Since the inner diameter of the longitudinal hole part 56b of the primary-side flow path 56 has to be allocated as large as possible, making the diameter of the inner side surface 53b smaller than the outside of the attachment groove 65 serving as outside of a valve swaging part is not impossible but is required to be avoided because of processing difficulty. In the present example, the inner diameter of the longitudinal hole part 56b is set approximately 7 mm and the valve seat 52 is provided on its outer diameter side, and thus the diameter of the inner side surface 53b is approximately 15 mm at minimum. Thus, the groove width w of the present example is set at (the diameter of the outer side surface 53a–the diameter of the inner side surface 53b)/2=3.6 mm.

If a groove depth h of the annular groove 53 is set too shallow, the inter section cross-sectional area S between the annular groove 53 and the secondary-side flow path 57 is small and, conversely, if it is set too deep, the bottom part of the annular groove 53 interferes with the primary-side flow path 56. Thus, in the present example, the groove depth h is set at approximately 8.0 mm, and the structure of the primary-side flow path 56 is configured of the tilted part 56a and the longitudinal hole part 56b so as to be sank below this annular groove 53 set slightly deeply, thereby avoiding the interference therebetween.

Next, a suitable range of numerical values of the height H of the annular groove 53 is described. In this fluid analysis, with the groove width w of the annular groove 53 being fixed at 3.6 mm, the inner diameter R of the secondary-side flow path 57 at 410.2 mm (here, the cross-sectional area T at 81.7 mm$^2$), and the penetration depth L at 2.6 mm, the Cv value analysis was performed by changing the height H of the annular groove 53 to acquire a lower limit value of the height H satisfying the target Cv value or more. With fluctuations of this height H, the groove depth h and the intersection cross-sectional area S also fluctuate.

As a result, it turned out that the lower limit value of the height H with respect to the target Cv value equal to or larger than 0.75 was 1.9 mm. This value is converted to a groove depth h of approximately 6.0 mm, and this is the lower limit value of the groove depth h. Also, when the position of the bottom surface 53c of the annular groove 53 is below the center axis X in FIG. 2, interference with the primary-side flow path 56 occurs. Thus, the upper limit of the groove depth h is on the order of approximately 9.0 mm, which is at the position of this center axis X. Thus, in the present example, the numerical value range of the groove depth h is suitably on the order of 6.0 mm to 9.0 mm. Note that, in a relation with the groove width w, h/w on the order of approximately 1.8 to 2.5 is suitable. Also, when this height H was the above-described lower limit value, the intersection cross-sectional area was 27.3 mm$^2$.

Next, a suitable numerical value range in a relation between the groove width w and the inner diameter R is described. Also in this fluid analysis, with the groove width w of the annular groove 53 being fixed at 3.6 mm, the groove width h at 8.0 mm, and penetration depth L at 2.6 mm, the Cv value analysis was performed by changing the inner diameter R of the secondary-side flow path 57 to acquire a lower limit value of the inner diameter R satisfying the target Cv value or more. With fluctuations of this inner diameter R, the height H and the cross-sectional areas S and T also fluctuate.

As a result, it turned out that the lower limit value of the inner diameter R with respect to the target Cv value of 0.75 was ϕ7.5 mm. Note that although no fluid analysis has been performed, from the structure of the body 50 of the present example, the diameter can be increased to the extent that the outer seal part remains, and therefore the upper limit value of the inner diameter R is approximately ϕ16 mm. Thus, in the present example, a suitable numerical value range of the inner diameter R of the secondary-side flow path 57 is ϕ7.5 mm to ϕ16 mm. Thus, in the relation with the groove width w, R/w on the order of approximately 2.0 to 4.5 times is suitable. Also, when this inner diameter R was the above-described lower limit value, the intersection cross-sectional area S was 28.7 mm$^2$.

Furthermore, when the target Cv value was set equal to or larger than 0.86, which is more suitable, the lower limit value of the inner diameter R was ϕ10.2 mm. Thus, it is more suitable to set a numerical value range of R/w corresponding to this at approximately 2.8 to 4.5.

Next, a suitable numerical value range in a relation between the intersection cross-sectional area S and the cross-sectional area T is described. Also in this fluid analysis, with the groove width w of the annular groove 53 being fixed at 3.6 mm, the groove width h at 8.0 mm (here, the height H at 3.9 mm), and the inner diameter R of the secondary-side flow path 57 at ϕ10.2 mm (here, the cross-sectional area T at 81.7 mm$^2$), the Cv value analysis was performed by changing the penetration depth L of the secondary-side flow path 57 to acquire a lower limit value of the penetration depth L satisfying the target Cv value or more. With fluctuations of this penetration depth L, the intersection cross-sectional area S also fluctuates.

As a result, it turned out that the lower limit value of the penetration depth L with respect to the target Cv value equal to or larger than 0.75 was 0.6 mm. Also, when the lower limit value was as such, the intersection cross-sectional area S was 25.2 mm$^2$.

The above fluid analysis results are summarized as in Table 1 below.

TABLE 1

| | |
|---|---|
| 1 | LOWER LIMIT VALUE ANALYSIS FOR H |
| | LOWER LIMIT VALUE ANALYSIS FOR R |
| | LOWER LIMIT VALUE ANALYSIS FOR L |
| 2 | HEIGHT H |
| | PENETRATION DEPTH L |
| | INNER DIAMETER R OF SECONDARY-SIDE FLOW PATH |
| | CROSS-SECTIONAL AREA T OF SECONDARY-SIDE FLOW PATH |
| | GROOVE WIDTH w |
| | GROOVE DEPTH h |
| | INTERSECTION CROSS-SECTIONAL AREA S |
| 3 | LOWER LIMIT VALUE |
| | 1.9 mm |

Also, in the above, it can be said that the value of the intersection cross-sectional area S is desirably set equal to or larger than 28.7 mm$^2$, which is the highest numerical value with respect to the setting of the target Cv value equal to or larger than 0.75. In this case, in the relation with the cross-sectional area T of the secondary-side flow path 57, by using 81.7 mm$^2$, which is the largest value of T, it can be thought that ensuring S/T=on the order of approximately 35% or more is sufficient. Thus, setting S>T as suggested in the prior art is not required, and the present invention contributes to an improvement in processability of the body and resistance of the fluid.

Next, the structure of the valve actuator (pressurizing means 54) of the present example is described. In FIG. 1, the valve actuator of the present example is an air-driven actuator having arranged therein a piston 2 pressed by a repulsive member 8 (spring 8) provided in the actuator main body 100 and at least two air chambers 3 (3a, 3b) for moving the piston 2 by air pressure and having a booster mechanism 1 for causing a force amplified in a valve-close direction to be exhibited accommodated in any of the air chambers 3.

A cover 4 assumes an outer appearance with a substantially cylindrical shape. At an axial center position, a connecting part 5 for connecting an air source externally provided and not depicted is provided, a flow path 5a linked thereto is formed and, furthermore, a fit-in part 10 capable of fitting in the piston 2 linked thereto is provided. At a lower end of the cover 4, a male screw part 9 that can be screwed to a female screw part 7 of a casing 6 is provided. Also, inside the cover 4, a receiving part 11 for pressing the spring 8 is provided in a recessed form.

The casing 6 is formed so as to have a cylindrical outer appearance having a diameter substantially equal to that of the cover 4, with the above-described female screw part 7 formed at an upper end and a male screw part 14 that can be screwed to a female screw part 13 of a base 12 at a lower end. To seal between the female screw part 13 and the male screw part 14, an O ring 15 is interposed therebetween. Also, on an inner circumferential surface of the casing 6, a step part 17 to be engaged with a sub-base 16 is formed.

The base 12 has an upper part cylindrically formed with a diameter substantially equal to that of the casing 6 and a lower part formed so as to be diameter-reduced more stepwise than the upper part and having formed therein a male screw part 20 that can be screwed to a female screw part 62 of the body 50. Also, at an axial center position at the center, an attachment hole 22 is open, in which an output member 21 (disk member 21) can fit for attachment. On the inner circumferential surface of this attachment hole 22, an O ring 23 is provided.

A bonnet 32 is formed in a substantially cylindrical shape and, in assembling the valve of the present example, is provided between the base 12 and the body 50. With a fastening force when the female screw part 62 is screwed to the male screw part 20, a lower end face of the base 12 pressurizes the bonnet 32. With this pressurizing force, a circumferential edge part of the diaphragm 55 is interposed between the lower surface of the bonnet 32 and the convex part 64 to be fixed in the valve chamber. Also, the inner circumferential surface of the bonnet 32 is a cylindrical space formed to have a substantially equal diameter. To this inner circumferential surface, a diaphragm piece 33 in a substantially columnar shape fits so as to be able to slide on this inner circumferential surface nearly without resistance. Also, the upper surface of the diaphragm piece 33 is provided so as to allow a lower end face of the disk member 21 fitting in the attachment hole 22 to make contact therewith.

The piston 2 is configured by integrally forming a piston part 2a and an extended part 2d and integrally forming a piston part 2b and an extended part 2c and combining these two members together. Specifically, as for the piston part 2a and the extended part 2c, the disk-shaped piston part 2a and the columnar-shaped extended part 2d having a flow path 36 therein are integrally formed in an umbrella shape, and the circular end face of the extended part 2d is notched to make a groove passing through an opening of the flow path 36 serving as a center position, thereby forming a flow path 35. The piston part 2b and the extended part 2c having a flow path 34 therein are also integrally formed in a similar manner in an umbrella shape. Then, the end face of the extended part 2d notched to have the flow path 35 is combined at the center position of the piston part 2b so that the flow paths 34 and 35 communicate each other, thereby configuring the piston 2 from the two members. However, the entire piston 2 may be integrally configured from a single member.

Also, on outer circumferential edge parts of the piston parts 2a and 2b, O rings 37 and 38 are respectively provided, which can seal the inner circumferential surface of the casing 6 while sliding. The outer diameters of the piston parts 2a and 2b conform to the inner diameter above the step part 17 of the casing 6 and the inner diameter therebelow, respectively. As will be described further below, valve stroke operation of the piston 2 in the actuator main body 100 can be performed in accordance with supply and discharge of air, while hermeticity inside the air chambers 3a and 3b is maintained.

With the above-described structure, when assembling the actuator of the present example is completed, a hermetic space formed between a lower surface side of the piston part 2a and an inner circumferential surface of the base 12 becomes a first air chamber 3a to which supply air from the flow path 36 is introduced, and a hermetic space formed between a lower surface side of the piston part 2b and an upper surface side of the sub-base 16 becomes a second air chamber 3b to which supply air from the flow path 35 is introduced. In this manner, in the present example, the number of air chambers 3 is increased to provide two, that is, the first air chamber 3a and the second air chamber 3b. With the structures of these piston 2 and casing 6, the plurality of air chambers are provided in a compact form. Thus, in the present example, while an excessive increase in the size of the actuator main body 100 and an increase in the number of components are avoided, a reliable air driving force can be ensured. Note that in a range in which the height of the actuator main body 100 is allowable by conditions, for example, the casing 6 may be provided so as to be long and the piston 2 may have a structure of three stages or more.

The disk member 21 is formed of a substantially disk-shaped large-diameter part 39 making contact with cam faces 42b and 43b of cam members 42 and 43, which will be described further below, respectively, and a substantially cylindrical small-diameter part 40 that can fit in the attachment hole 22 formed in the base 12 on a lower part of the actuator and, in the present example, these are integrally formed. Specifically, as depicted in FIG. 1, in the disk member 21 incorporated in the actuator of the present example, the small-diameter part 40 fits in the attachment hole 22 so as to be vertically slidable. A circumferential edge part of the large-diameter part 39 is engaged with a step surface 41 so as to be vertically movable, the step surface formed on a bottom surface inside the base 12 so as to conform to the shape of the large-diameter part 39. Note that as for the properties of material of the disk member 21 of the present example, a material acquired by performing MoS2 coating process (film thickness of approximately 10 μm) on steel for machine structural use (S45C-H HRC40) is used.

On the inner circumferential surface of the attachment hole 22, the O ring 23 is attached to seal a space between the attachment hole and the small-diameter part 40. In the operation of the present example, as will be described further below, the base 12 serves as a still-side member, and the disk member 21 serves as a movable-side member. Thus, if the seal member is provided on a base 12 side, the thickness of the bottom part of the base 12 can be decreased, and this is thus suitable for downsizing the valve.

In FIG. 1, the booster mechanism 1 of the present example is configured so that the paired cam members 42 and 43 are pivotally attached to one common swing shaft 44 (cam shaft) and also these paired cam members 42 and 43 are accommodated in the first air chamber 3a. In these cam members 42 and 43, contact parts 42a and 43a, respectively, which make contact with the piston 2, are provided at their upper end parts and, on the other hand, the convex cam faces 42b and 43b, respectively, which make contact with the disk member 21, are formed at their lower end parts. Note that 47a denotes an annular part of a holder 47, and 47b denotes a support part of the holder 47. The holder 47 of the present example is formed of the annular part 47a formed in an annular shape so as to conform to a low side surface of the base 12 and two support parts 47b integrally formed on an inner circumferential side of this annular part 47a and arranged so as to be opposed to each other.

The contact parts 42a and 43a are provided with roller parts 45 and 46, respectively. To the roller parts 45 and 46, rollers 45a and 46a are rotatably provided to roller shafts 45b and 46b, respectively. In the present example, these rollers 45a and 46a make contact with the lower surface of the piston part 2a so as to be rotatably movable, thereby configuring the contact parts 42a and 43a. Note that each contact part may not be provided with a roller part as described above and, as schematically depicted, for example, in FIG. 4, which will be described further below, may be configured such that an arc part in a substantially arc shape is formed at an upper end part of the cam member and this arc part directly makes contact with and slides on the lower surface of the piston. In this case, the number of components of the actuator can be reduced to allow a simple structure.

Next, the operation of the actuator of the present example is described. First, when air is being vented from the air chamber 3 in a state of being filled with air, the internal pressure of the first air chamber 3a and the second air chamber 3b at a predetermined pressure is decreased to outside pressure. As the pressure received from the air chamber 3 is decreased, the piston 2 is depressed downward by the pressing force of the spring 8. The lower surface of the depressed piston 2 pressurizes the contact parts 42a and 43a of the booster mechanism 1 while making contact therewith to cause the cam members 42 and 43 to be respectively rotated about the swing shaft 44. With this rotation, the cam faces 42b and 43b pressurize the large-diameter part 39 of the disk member 21 to cause the disk member 21 to be depressed downward.

Since a lower end part of the small-diameter part 40 of the disk member 21 makes contact with the upper surface of the diaphragm piece 33, with the disk member 21 being depressed, the diaphragm piece 33 is also depressed. Since the lower surface of the diaphragm piece 33 makes contact with the diaphragm 55, when the diaphragm piece 33 descends, by its lower surface, the upper surface of the diaphragm 55 is pressurized to be flexibly deformed. The lower surface of the diaphragm piece 33 deforms the diaphragm 55 so that the diaphragm is recessed downward. With the lower surface of the diaphragm 55 being press-fitted to the upper surface of the valve seat 52 with a predetermined pressure, the diaphragm piece 33 is engaged at a valve-stroke lower-limit position, and also the primary-side flow path 56 and the annular groove 53 in the valve chamber are separated to cause the valve to become in a full-closed state.

Next, the operation is described in which the air chamber 3 in this full-closed state is filled with air to become in a full-open state. When air is introduced to the air chamber 3, air injected from an air source not depicted passes through the flow path 34 provided to the extended part 2c of the piston 2, and next passes through the flow path 35 provided to the extended part 2b to be injected to the second air chamber 3b. Simultaneously, air passes through the flow path 36 provided to the extended part 2d to be injected also to the first air chamber 3a.

The piston 2 is pressed by the spring 8 downward. In the first air chamber 3a, only the piston part 2a is a movable member, except the disk member 21, which will be described further below. Thus, when the air pressure of the air chamber 3a increases to exceed the pressing force of the spring 8, this air pressure acts to push the piston part 2a upward. Similarly, also in the second air chamber 3b, since the sub-base 16 is fixed to the inner circumferential surface of the casing 6, only the piston unit 2b is the movable member and, when the air pressure in the air chamber 3b increases to exceed the pressing force of the spring 8, the piston part 2b is pushed upward. Thus, while keeping hermetic seal between the piston and the inner circumferential surface of the casing 6, the entire piston 2 slides to be pushed upward.

Here, the air pressure acting on the piston 2 is proportional to the area of the piston 2 oriented to the inside of the air chamber 3. In the present example, as for the air chamber 3, in addition to the first air chamber 3a, the second air chamber 3b is provided to configure two stages in a compact form via the sub-base 16 formed to be thin inside the same casing 6. Thus, while an increase in the size of the actuator is avoided, a sufficient piston area is ensured.

On the other hand, the diaphragm 55 has a shape self-reset force. Thus, as described above, with an increase in the pressure inside the air chambers 3a and 3b, the contact parts 42a and 43a of the cam members 42 and 43 are released from pushing-down pressing by the piston 2, and then the diaphragm 55 can return to have a convex shape mildly curved upward in a natural state by a self-reset counterforce. With this self-reset, the diaphragm becomes unseated from the valve seat 52 to cause the valve to become in a full-open state. More specifically, with this counterforce, the diaphragm piece 33 is pushed upward, and the disk member 21 is thereby also pushed upward. With this, the disk member 21 pushed up the cam faces 42b and 43b. This causes the cam members 42 and 43 to rotate about the swing shaft 44.

Furthermore, the present invention is not limited to the description of the above embodiments, and can be variously modified in a range not deviating from the gist of the invention described in claims of the present invention.

REFERENCE SIGNS LIST 50 body
51 valve chamber
52 valve seat
53 annular groove
54 pressurizing means
55 diaphragm
56 primary-side flow path
57 secondary-side flow path
59 semicircular portion
60 semicircular notched groove
61 abutting surface
R inner diameter
w groove width
S intersection cross-sectional area
$S_1$ area of the semicircular portion
$S_2$ contiguous area of the semicircular notched groove
T cross-sectional area of the secondary-side flow path

The invention claimed is:

1. A diaphragm valve comprising:

a valve seat disposed in a valve chamber in a body;

an annular groove provided on an outer periphery of the valve seat;

a diaphragm provided so as to be able to make contact with and leave the valve seat via pressurizing means; and a primary-side flow path communicating with the valve chamber, wherein a secondary-side flow path is contiguously provided with an outer diameter of the annular groove such that an inner diameter of the secondary-side flow path intersects an outer peripheral surface of the annular groove in a linear direction so as to be substantially perpendicular to the outer peripheral surface of the annular groove, wherein a semi-circular portion of the secondary-side flow path is contiguously provided on the outer diameter of the annular groove, and a semicircular notched groove is formed by contiguously providing the secondary-side flow path up to a position in front of an inner diameter of the annular groove without reaching the inner diameter of the annular groove, wherein the semi-circular portion of the secondary-side flow path defines a first region having a substantially semi-circular shape as viewed in a lateral direction of the body, the semicircular notched groove of the secondary-side flow path defines a second region that is substantially bow-shaped as viewed from directly above the body, and an intersectional cross-sectional area of the annular groove and the secondary-side flow path is an area obtained by adding an area of the first region and an area of the second region, wherein the inner diameter of the secondary-side flow path is 2.0 to 4.5 times a groove width of the annular groove, wherein the intersectional cross-sectional area is smaller than a cross-sectional area of the secondary-side flow path, and wherein the intersectional cross-sectional area is configured to be equal to or larger than 35% with respect to the cross-sectional area of the secondary-side flow path to acquire a predetermined Cv value.

2. The diaphragm valve according to claim 1, wherein the inner diameter of the secondary-side flow path is 2.8 to 4.5 times the groove width of the annular groove.

3. The diaphragm valve according to claim 1, wherein an abutting surface of the semicircular notched groove has a flat shape made by flat end processing.

4. The diaphragm valve according to claim 1, wherein the predetermined Cv value is equal to or larger than 0.75.

5. The diaphragm valve according to claim 2, wherein an abutting surface of the semicircular notched groove has a flat shape made by flat end processing.

* * * * *